United States Patent [19]

Fujio et al.

[11] Patent Number: 4,921,905
[45] Date of Patent: May 1, 1990

[54] PROCESS FOR THE PRODUCTION OF BLOCK COPOLYMER OF PROPYLENE AND ETHYLENE

[75] Inventors: Ichiro Fujio; Kaneo Ito; Tadashi Asanuma, all of Takaishi, Japan

[73] Assignee: Mitsui Toatsu Chemicals, Incorporated, Tokyo, Japan

[21] Appl. No.: 205,484

[22] Filed: Jun. 1, 1988

Related U.S. Application Data

[63] Continuation of Ser. No. 943,701, Dec. 19, 1986, abandoned.

[30] Foreign Application Priority Data

Jan. 28, 1986 [JP] Japan .................................. 61-14722

[51] Int. Cl.$^5$ ........................ C08F 2/00; C08F 293/00; C08F 297/08
[52] U.S. Cl. ........................................ 525/53; 525/323
[58] Field of Search .................................. 525/53, 323

[56] References Cited

FOREIGN PATENT DOCUMENTS 2094319 9/1982 United Kingdom .

Primary Examiner—Wilbert J. Briggs, Sr.
Attorney, Agent, or Firm—Oblon, Spivak, McClelland, Maier & Neustadt

[57] ABSTRACT

A block copolymer of propylene can be obtained with its quality controlled uniform by conducting at first continuous polymerization of propylene in a polymerization system, receiving a polymer slurry, which has been discharged continuously from the polymerization system, in a batchwise polymerization tank, feeding ethylene to the tank to conduct batchwise polymerization of ethylene and propylene. Upon discharge of a copolymer slurry formed by the preceding batchwise polymerization, at least a predetermined amount of unreacted ethylene is left over in the tank. Into the tank with the unreacted ethylene still left over therein, there are simultaneously charged the polymer slurry from the polymerization system and a deactivator. During this charging, ethylene is not supplied. The charging rate of the deactivator is controlled in such a way that the partial pressure of ethylene in the vapor phase of the tank always reaches a predetermined value at the time point of completion of reception of the polymer slurry therein.

7 Claims, 1 Drawing Sheet

PROCESS FOR THE PRODUCTION OF BLOCK COPOLYMER OF PROPYLENE AND ETHYLENE

This application is a continuation of application Ser. No. 06/943,701 filed on Dec. 19, 1986, now abandoned.

TECHNICAL FIELD

This invention relates to a process for the production of a block copolymer of propylene. Specifically, it relates to a method for controlling polymerization conditions constant in a batchwise polymerization system upon producing a block copolymer of propylene by conducting at first continuous polymerization of substantially propylene alone and then batchwise copolymerization of propylene and ethylene in the batchwise polymerization system.

It has already been known well to produce so-called block copolymers of propylene by conducting at first polymerization of substantially propylene alone and then copolymerization of ethylene and propylene with a view toward improving the impact resistance of polypropylene, especially, at low temperatures while maintaining the inherent excellent stiffness of polypropylene. Reference may be had to Japanese Pat. Publication Nos. 12810/1968, 19542/1969, 20621/1969 and 24593/1974 by way of example.

In the meantime, the present inventors have already proposed, as processes for the production of propylene block copolymers having excellent quality, a process for conducting at first continuous polymerization of substantially propylene alone while using propylene itself as a polymerization medium and then effecting batchwise copolymerization of ethylene and propylene as well as several improvements thereto. Reference may be had, for example, to Japanese Pat. Laid-Open Nos. 30534/1982, 145114/1982, 145115/1982, 149319/1982 and 149320/1982.

However, the conventionally-proposed production processes of propylene block copolymers by the combination of a continuous polymerization process and a batchwise polymerization process, especially, those employing a deactivator upon batchwise polymerization to control the catalytic activity in the batchwise polymerization system are accompanied by a drawback inherent to batchwise polymerization that difficulties are encountered in maintaining the quality of the resulting propylene block copolymers uniform. It has hence been desired to develop an effective control method for the production of a propylene block copolymer of uniform quality.

SUMMARY OF THE INVENTION:

The present inventors have carried out an extensive research with a view toward providing a solution to the above-described problems.

An object of this invention is therefore to provide a process for obtaining a propylene block copolymer with its quality controlled uniform upon production of the propylene block copolymer by conducting at first continuous polymerization of substantially propylene alone and then batchwise copolymerization of ethylene and propylene.

The above object of this invention is achieved by the following process:

In a process for the production of a block copolymer of propylene by conducting continuous polymerization of substantially propylene alone at first in a continuous polymerization system, receiving for a predetermined period of time a first polymer slurry, which has been discharged continuously from the polymerization system, in either one of two or more batchwise polymerization tanks provided in parallel to each other and upon a lapse of the predetermined period of time, changing the delivery of the first polymer slurry to the other batchwise polymerization tank or either one of the remaining batchwise polymerization tanks, feeding at least ethylene to each of the batchwise polymerization tanks after completion of the reception of the first polymer slurry therein so as to conduct batchwise polymerization of ethylene and propylene successively in the polymerization tanks, and then discharging a second polymer slurry to a deactivation tank from each of the batchwise polymerization tanks upon completion of the batchwise polymerization therein while allowing a predetermined amount of unreacted ethylene to remain in the batchwise polymerization tanks, the improvement wherein the supply of fresh ethylene is halted to each of the batchwise polymerization tanks until completion of reception of the first polymer slurry from the continuous polymerization system, and a deactivator is charged into each of the batchwise polymerization tanks at the same time as the reception of the first polymer slurry therein while controlling the charging rate of the deactivator in such a way that the partial pressure of ethylene in the vapor phase of each of the batchwise polymerization tanks reaches a predetermined value at the same time as the completion of reception of the first polymer slurry therein.

Figure 1:
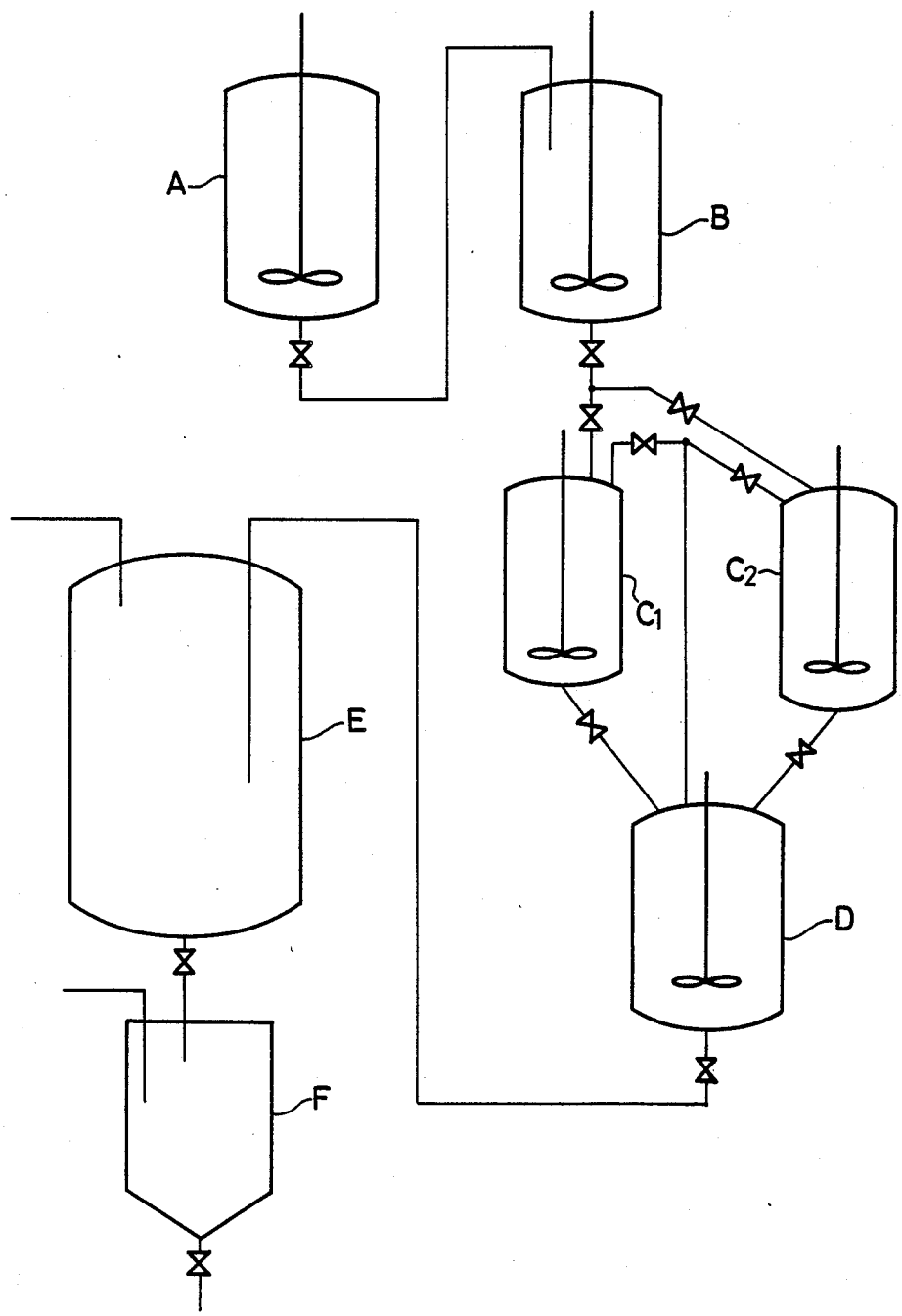
FIG. 1 shows, by way of example, a polymerization apparatus suitable for use in the practice of the process of this invention.

DETAILED DESCRIPTION OF THE INVENTION AND PREFERRED EMBODIMENTS FOR THE PRACTICE OF THE INVENTION

Various known catalyst systems can be used as catalysts to be employed upon continuous polymerization of substantially propylene alone and batchwise polymerization of ethylene and propylene and no particular limitation is hence imposed thereon. Any catalyst system may be used so long as it can produce polypropylene of high stereoregularity. As solid catalysts for example, may be mentioned titanium trichloride obtained by reducing titanium tetrachloride with metallic aluminum, hydrogen or an organic aluminum, those obtained by modifying the titanium trichloride with electron-donative compounds, as well as those prepared by modifying carriers such as magnesium halides or substances, which have been obtained by treating such carriers with electrondonative compounds, with titanium halides.

Either one of the above-described solid catalysts can be used for both continuous polymerization of substantially propylene alone and batchwise polymerization of ethylene and propylene, provided that it is used in combination with an organoaluminum compound and if necessary, an electron-donative compound.

As the organoaluminum compound, it is possible to use a trialkylaluminum, dialkylaluminum halide, alkylaluminum sesquihalide or alkylaluminum dihalide. Illustrative examples of the alkyl group may include methyl, ethyl, propyl, butyl and hexyl groups. As exemplary halides, may be mentioned chloride, bromide and iodide.

As a preferable solid catalyst system, may be mentioned that obtained by modifying with a titanium halide a carrier such as magnesium halide or a substance formed by treating such a carrier with an electron-donative compound. Specific examples may include that obtained by grinding magnesium chloride together with an organic compound and then treating the resultant mixture with titanium tetrachloride and that prepared by dissolving a reaction product of magnesium chloride and an alcohol in a hydrocarbon solvent and then treating the resultant solution with a precipitant such as titanium tetrachloride so as to insolubilize the reaction product in the hydrocarbon solvent, and if necessary, modifying the thus-insolubilized reaction product with an electron-donative compound such as ester or ether and then treating the resulting substance with titanium tetrachloride.

Illustrative examples of the organic aluminum to be used in combination may preferably include trimethyl aluminum, triethyl aluminum, tripropyl aluminum, tributyl aluminum, dimethylaluminum chloride, diethylaluminum chloride, dipropylaluminum chloride, and dibutylaluminum chloride. If necessary, an ester, ether, orthoester or alkoxysilane may also be used in combination as a stereoregularity improver. As the deactivator to be introduced into a polymerization tank in which batchwise polymerization is conducted, the above-described stereoregularity improver can be used. In addition, an alcohol, water, or a halide such as aluminum halide or silane halide may also be used in some instances as the deactivator.

Here, the organic aluminum and stereoregularity improver may be used in amounts of 0.1–1000 and 0.01–300 parts by weight, preferably, 0.5–100 and 0.01–30 parts by weight respectively per part by weight of the solid catalyst. The proportion of the deactivator varies depending on the type and of the deactivator and the proportion of the organic aluminum relative to the solid catalyst and is not specified accordingly. However, the deactivator may generally be used in an amount of 0.01–100 parts by weight per part by weight of the solid catalyst.

The present invention may be practiced by using a bulk polymerization process in which propylene itself is preferably used as a polymerization solvent. Another inert medium such as hexane, heptane, benzene or toluene may also be used up to about 20 wt.% as needed.

In the present invention, the term "continuous polymerization of substantially propylene alone", which is conducted at first, usually means homopolymerization of propylene or copolymerization of propylene and another γ-olefin in such a small amount that the content of the γ-olefin does not exceed 6 wt.% of the whole monomers. It is preferable to conduct the continuous polymerization of substantially propylene alone, which is conducted at first, up to 50–95 wt.% of the entire polymerization. Any degrees smaller than 50 wt.% are not preferable because the block copolymers obtained after the batchwise polymerization lack of the excellent stiffness inherent to polypropylene. On the other hand, any degree greater than 95 wt.% cannot bring about any sufficient improvement to the impact resistance by the block copolymerization. The continuous polymerization may be effected at 50–90° C. The polymerization pressure may vary depending on the partial pressure of the monomer employed, the amount of an inert solvent employed as desired and the amount of hydrogen used optionally for the control of the molecular weight. The continuous polymerization of substantially propylene alone is conducted in a polymerization tank constructed of a single tank or two or more tanks connected in series. In order to maintain the polymer concentration constant in the slurry to be delivered to the subsequent batchwise polymerization tanks and also to make the quality of the polymer uniform, the continuous polymerization of substantially propylene alone is effected while controlling operational conditions. As specific operational conditions, any conventionally-known methods may be employed.

In the present invention, the slurry obtained as a result of the above-described continuous polymerization is received in polymerization tanks, in which batchwise polymerization is conducted. Regarding these procedures, specific examples are disclosed, for example, in Japanese Pat. Laid-Open Nos. 149320/1982 and 11519/1983. Namely, the batchwise polymerization can be practised by connecting two or more batchwise polymerization tanks in parallel to each other to a polymerization tank, in which the continuous polymerization is conducted, and changing over the delivery of the polymer slurry successively.

To each of the polymerization tanks in which the batchwise polymerization is effected, the above-mentioned deactivator is charged to decrease uncontrolled polymerization which takes place during the reception of the slurry into the polymerization tanks. If deactivation takes place to an unduly large degree by the charging of the deactivator, it becomes necessary to increase the amount of a catalytic activity improver, which is optionally introduced upon conducting the intended copolymerization, to a considerable extent. Such excessive deactivation is hence not preferable. Incidentally, the term "catalytic activity improver" as used herein means any desired component or components of the aforementioned catalytic systems with an organoaluminum compound being especially suited. When the batchwise polymerization is conducted especially by a multi-stage reaction in which the reaction ratio of ethylene to propylene or the molecular weight of their reaction product is varied, it takes time until the effects of the catalytic activity improver show up where the catalytic activity improver is added in a large amount, leading to a problem that the degree of polymerization cannot be controlled to a desired proportion in each of the reaction stages and no block copolymer having desired physical properties can be obtained. If the degree of deactivation is too small on the other hand, more uncontrolled copolymerization takes place and similarly, no block copolymer having desired physical properties can be obtained. It has hence been proposed to lower the catalytic activity to a desired level in accordance with the desired physical properties of a target block copolymer, specifically, by controlling the charging rate of the deactivator at a predetermined level. In actual production of polypropylene on an industrial scale, there are however variations in catalytic activity, the purity of propylene, the purity of an inert hydrocarbon which may be used optionally, etc. In usual production of an industrial scale, the charging rate of a catalyst to a continuous polymerization tank is varied (including variations in the proportions of individual components of a catalyst) in order to maintain a constant production rate. It is hence impossible to maintain the degree of deactivation at a constant level by holding constant the charging rate of the deactivator to the polymerization tanks in which the batchwise polymerization is conducted. Accordingly, the above method was accompanied by a problem that the physical properties of the resulting block copolymer do not remain constant.

The preferable reaction ratio of ethylene/propylene in the polymerization of ethylene and propylene, which is effected batchwise in the present invention, may range from 20/80 to 95/5 by weight. The batchwise polymerization of ethylene and propylene may be effected to such an extent that the resulting ethylene-propylene copolymer amounts to 5–50 wt.% of the whole polymer. Here, a portion of the ethylene may be replaced by another α-olefin. The batchwise polymerization is conducted, usually, at room temperature —70° C., preferably, 30–60° C. in the presence of hydrogen as a molecular weight modifier. The polymerization pressure should be determined in accordance with desired ethylene and hydrogen concentrations in the vapor phase and the amount of an inert hydrocarbon which may be used as desired.

It is not to make constant the amount of a deactivator to be added to each polymerization tank where the batchwise polymerization is conducted but to maintain the degree of deactivation at a constant level that is important in this invention to improve the above-described drawbacks of the prior art. As a controlled medium for this purpose, the partial pressure of ethylene at the time of completion of the reception of the slurry is used. Namely, the deactivator is charged while controlling its charging rate in such a way that the partial pressure of ethylene reaches a predetermined value at the time of completion of the reception of the slurry. As operations required for the above control, may be mentioned that the discharge of the slurry after the batchwise polymerization is effected until practically no liquid medium remains, in other words, in such a manner that at least a predetermined amount of unreacted ethylene is always left over in each tank, ethylene is not additionally fed during reception of the slurry, and the internal temperature of each polymerization tank adapted to conduct the batchwise polymerization therein is controlled at a predetermined constant level upon completion of reception of the slurry. Regarding the internal temperature, it is however possible to make the predetermined value of the partial pressure of ethylene adjusted by detecting the internal temperature. As a method for detecting the partial pressure of ethylene, the partial pressure may be determined as a simple method by sampling the vapor-phase gas and analyzing its composition in accordance with gas chromatography.

The process of this invention can be applied not only to a production process of a block copolymer, in which a catalytic activity improver is added to each polymerization tank for batchwise polymerization, but also to a polymerization process in which such a catalytic activity improver is not added.

After completion of the prescribed batchwise polymerization in each polymerization tank in accordance with the process of this invention, a desired amount of a deactivator is charged into the polymerization tank if desired. Thereafter, the contents of the polymerization tank, namely, the resultant slurry is discharged to a deactivation tank in which the polymerization activity of the slurry is deactivated. The polymerization tank is now ready for reception of a next supply of the polymer slurry from the continuous polymerization system. Upon this discharge, the slurry is discharged until practically no liquid medium remains in the polymerization tank as described above. If desired, the interior of the polymerization tank is washed with a small amount of liquid polypropylene and the washing is also discharged to the deactivation tank. It is however important for the polymerization tank to be ready for reception of a next supply of the polymer slurry in such a state that at least a predetermined amount of unreacted ethylene remains in the polymerization tank. The predetermined amount of unreacted ethylene is left over in order to allow the partial pressure of ethylene in the vapor phase of the tank to reach a predetermined level at the time of completion of reception of the slurry by charging the deactivator under control simultaneously with the reception of a next supply of the polymer slurry from the continuous polymerization system. The predetermined amount of unreacted ethylene to be left over is therefore determined by the above-mentioned predetermined level. As a specific and practical procedure for allowing at least a predetermined amount of unreacted ethylene to remain, it is preferable to provide, as described in the subsequent examples, each batchwise polymerization tank at a level higher than the deactivation tank so that the transfer of the slurry or the washing is effected by the difference in head and during the transfer of the slurry, the vapor phase of the batchwise polymerization tank and that of the deactivator are connected together by way of a pressure equalizing pipe so as to prevent components of the vapor phases from flowing out of the system.

Specific conditions for the deactivation of the polymer slurry received in the deactivation tank and those for the process for obtaining a powder-like block copolymer as a final product from the thus-deactivated polymer slurry can be suitably selected from those known to date. Exemplary conditions will specifically be described in the subsequent Examples. Needless to say, the present invention shall not be limited to the conditions to be described in the subsequent Examples.

It is possible to produce a block copolymer of uniform quality efficiently from the practice of the process of this invention. This invention is therefore extremely valuable from the industrial viewpoint.

The present invention will hereinafter be described further by the following Examples.

In the following Examples and Comparative Examples, melt flow indexes (hereinafter abbreviated as "MI"), flexural stiffnesses, Izod impact strengths (notched) and Du Pont impact strengths were measured in accordance with ASTM D1238, ASTM D747-63, ASTM D256-56 and JIS K6718 respectively. The MIs were measured at 230° C. and under a load of 2.16 kg. The flexural stiffnesses were measured at 20° C. On the other hand, the Izod and Du Pont impact strengths were measured at 20° C. and —10° C. respectively. Intrinsic viscosities (hereinafter abbreviated as "η") were measured at 135° C. in tetralin solutions. Isotactic indexes (hereinafter abbreviated as "II") were calculated as $$\frac{\text{Residue after extraction in boiling n-heptane}}{\text{Whole polymer}} (\%)$$

Referential Example 1, Example 1 and Comparative Example 1

(i) Preparation of components of solid catalyst:

An oscillating mill equipped with 4 pots, each of which had an internal volume of 4 l and contained 9 kg of steel balls having a diameter of 12 mm, was provided. In a nitrogen atmosphere, each of the pots was filled with 300 g of magnesium chloride, 60 ml of tetraethoxysilane and 45 ml of $\alpha,\alpha,\alpha$-trichlorotoluene, followed by grinding of the contents for 40 hours. Three kilograms of the thus-ground mixture and 20 l of titanium tetrachloride were added to an autoclave having an internal volume of 50 l. After stirring the contents at 80° C. for 2 hours, the supernatant was removed by decantation. Thereafter, 35 l of n-heptane was added and the resultant mixture was stirred at 80° C. for 15 minutes, followed by removal of the supernatant by decantation. After repeating that washing operation 7 times, 20 l of n-heptane was added further to form a slurry of a solid catalyst. A portion of the slurry of the solid catalyst was sampled and n-heptane was caused to evaporate off. An analysis of the residue indicated that 1.4 wt.% of Ti was contained in the solid catalyst (Lot No. 1). The above procedure was repeated to prepare additional four lots of the same solid catalyst. Their Ti contents were 1.7 (Lot No. 2), 1.6 (Lot No. 3), 1.9 (Lot No. 4) and 1.5 (Lot No. 5) respectively.

(ii) Polymerization:

Polymerization was conducted by using the polymerization apparatus depicted in FIG. 1.

REFERENTIAL EXAMPLE 1

In an autoclave having an internal volume of 50 l which had been fully dried and purged with nitrogen, there were charged 30 l of n-heptane, 50 g of the above solid catalyst (Lot No. 1), 240 ml of diethylaluminum chloride and 140 ml of methyl p-toluylate. The contents were then stirred at 25° C. The resultant mixture was used as a catalyst slurry mixture. Autoclaves A and B (reaction tanks for continuous polymerization), each of which had an internal volume of 300 l and had been fully dried and purged with nitrogen and then with propylene gas, were connected in series, while autoclaves $C_1$ and $C_2$ (reaction tanks for batchwise polymerization) each of which had an internal volume of 200 l were connected in parallel to each other after the autoclave B. An autoclave D (deactivation tank) having an internal volume of 300l was connected in series to the autoclaves $C_1$ and $C_2$. Autoclaves A and B were charged with 60 kg of propylene. Into the autoclave A, the above-prepared catalyst slurry mixture was charged at a velocity of 1 g/hr in terms of the solid catalyst, the other organoaluminum catalyst component, i.e., triethylaluminum at 1.5 ml/hr, and liquid propylene at 30 kg/hr. Charged automatically into the autoclave B were triethylaluminum at a velocity of 3.0 l hr and a propylene slurry, which had been drawn out of the autoclave A, at 30 kg/hr. While continuously drawing a propylene slurry at 30 kg/hr out of the autoclave B and charging hydrogen to the autoclaves A,B at such rates that the concentrations of hydrogen in the vapor phases of the autoclaves A,B were both maintained at 6.5 vol%, polymerization was conducted at 75° C. When the polymerization had been stabilized upon an elapsed time of 6 hours from the initiation of the polymerization, a small amount of a slurry was sampled out from the autoclave B in order to determine the $\eta$ and II of a polymer formed in the continuous polymerization system. Physical properties of the resultant powder were then measured. As a result, $\eta$ and II were found to be 1.41 and 96.0% respectively. The slurry, which was continuously being drawn out from a lower part of the autoclave B, was then charged into the autoclave $C_1$. At the same time, methyl p-toluylate was also charged at a velocity of 0.8 ml/30 min into the autoclave $C_1$. As a result, the activity was reduced to about 2/5. After receiving the slurry for 30 minutes in the autoclave $C_1$, the destination of transfer of the slurry and methyl p-toluylate was changed to the autoclave $C_2$.

While receiving the slurry and methyl p-toluylate, warm water was fed through a jacket so as to maintain the internal temperature of the autoclave $C_1$ at 45° C. After completion of reception of the slurry, ethylene and hydrogen were charged to adjust the hydrogen and ethylene concentrations to 0.80 vol% and 35.0 mol% respectively in the vapor phase. Polymerization was then conducted at 50° C. for 12 minutes and after addition of further ethylene, for 2.5 minutes at a hydrogen concentration of 0.74 vol% and ethylene concentration of 40.0 mol%. Thereafter, 2.0 ml of methyl p-toluylate was charged to reduce the activity to about ⅓. The thus-deactivated slurry was then transferred to the autoclave D in which 10 kg of liquid propylene and 50 ml of isopropanol had been charged in advance. The interior of the autoclave $C_1$ was washed with liquid propylene and the propylene washing was also delivered to the autoclave D.

Upon transfer of the slurry, the vapor phase of the autoclave $C_1$ (or $C_2$) and that of the autoclave D were connected to each other. The transfer of the slurry was effected by a difference in head, which was obtained by providing the autoclave $C_1$ (or $C_2$) above the autoclave D. During the period awaiting the reception of the next supply of the slurry, the internal pressure of each batchwise polymerization tank was therefore maintained constant at 22 kg/cm$^2$-Gauge.

On the other hand, a slurry was transferred from a lower part of the autoclave D to a flash tank E while charging isopropanol at 1 ml/hr into the autoclave D. Through a hopper F, the resultant block copolymer was obtained as powder. The discharge of the slurry from the autoclave D was effected continuously at a rate of about 40 kg/hr, so that about 10 kg of the slurry was left over in the autoclave D when the autoclave D received a next supply of the slurry from the autoclave $C_2$. After receiving the slurry from the autoclave B and methyl p-toluylate for 30 minutes in the autoclave $C_2$, a copolymerizing operation was conducted in the same manner as in the autoclave $C_1$. Namely, the slurry was transferred from the autoclave B to the autoclave $C_1$ for the first 30 minutes (0–30th minute). During the next 30 minutes (30th minute–1st hour), the transfer of the slurry was changed from the autoclave B to the autoclave $C_2$. In parallel with the reception of the slurry in the autoclave $C_2$, a batchwise polymerization reaction was conducted in the autoclave $C_1$ without receiving or discharging any slurry during that period, followed by discharge of the reaction product from the autoclave $C_1$ to the autoclave D. During the next 30 minutes (1st hour–1.5th hour), the transfer of the slurry was changed again from the autoclave B to the autoclave $C_1$. In parallel with the reception of the slurry in the autoclave $C_1$, a batchwise polymerization reaction was conducted in the autoclave $C_2$ without receiving or discharging any slurry during that period, followed by discharge of the reaction product from the autoclave $C_2$ to the autoclave D. Similar operation was thereafter repeated. The 1-hour period from the reception of the slurry in the autoclave $C_1$ to the reception of a next supply of the slurry in the same autoclave $C_1$ was counted as one operation of polymerization (this also applies to the autoclave $C_2$). The operation of the polymerization apparatus was conducted until the batchwise polymerization operations in the autoclaves $C_1,C_2$ were conducted 5 times each, namely, 10 times in total, thereby obtaining about 50 kg of a block copolymer.

EXAMPLE 1

Following the procedure of Referential Example 1 given above, the production of a block copolymer was conducted by effecting the batchwise polymerization operation 5 times per each of Lot No. 2 and No. 3 of the solid catalyst, i.e., 10 times in total, separately. In order to maintain the catalytic activity constant irrespective of the lot of the solid catalyst, the amount of triethylaluminum added in the continuous polymerization system was varied from one lot to another. In addition, the operation was conducted while controlling the amount of methyl toluylate charged concurrently with the slurry so as to allow the partial pressure of ethylene to reach 20 vol% in the vapor phase whenever the reception of the slurry is completed in each batchwise polymerization tank.

COMPARATIVE EXAMPLE 1

Using Lot Nos. 4 and 5 of the solid catalyst separately, a block copolymer was produced to an amount of about 50 kg per lot of the solid catalyst in accordance with the procedure of Example 1. In this comparative example, methyl toluylate which was charged simultaneously with the slurry to each batchwise polymerization tank was charged always constant at 0.8 ml like Reference Example 1.

Each of the powdery block copolymer samples, which had been obtained respectively in Referential Example 1, Example 1 and Comparative Example 1, was separately dried at 60° C. and 100 mmHg for 10 hours and after addition of usual additives, was granulated to measure its physical properties. Results are shown in a table.

REFERENTIAL EXAMPLE 2, EXAMPLE 2 AND COMPARATIVE EXAMPLE 2

REFERENTIAL EXAMPLE 2

Using Lot No. 1 of the solid catalyst, a block copolymer was produced under the same conditions as in Referential Example 1 except that the batchwise polymerization was conducted by changing the charging rate of methyl p-toluylate to 1.4 ml during the reception of the slurry in the batchwise polymerization tank and then charging ethylene and hydrogen in predetermined amounts and then introducing 3 ml of triethylaluminum under pressure.

EXAMPLE 2

Following the procedure of Referential Example 2 given above, block copolymers were prepared by using Lot Nos. 4 and 5 of the solid catalyst respectively. Similar to Example 1, the charging rate of triethylaluminum was changed in the continuous polymerization system so as to maintain the catalytic activity constant. During the batchwise polymerization, the addition of methyl toluylate was controlled to allow the partial pressure of ethylene to reach 7 vol% in the vapor phase upon completion of the reception of the slurry.

COMPARATIVE EXAMPLE 2

Following the procedure of the Example 2, block copolymers were prepared by using Lot Nos. 2 and 3 of the solid catalyst respectively. In this comparative example, the charging rate of methyl p-toluylate was controlled constant at 1.4 m; for each of the lots in the same manner as in Referential Example 2.

Regarding the powdery block copolymers obtained respectively in Referential Example 2, Example 2 and Comparative Example 2, their physical properties were measured after subjecting them to similar post treatments to those applied in the preceding examples. Results are also shown in the following table.

TABLE

| | Average charging rate of triethylaluminum to continuous polymerization system (ml/hr) | Lot No. of used catalyst | Average amount of methyl p-toluylate added to batch polymerization system (ml) | Physical properties of powder | | |
|---|---|---|---|---|---|---|
| | | | | Polymerization activity* (g/g-solid catalyst) | $\eta$ | II (%) |
| Ref. Ex. 1 | A 1.5<br>B 3.0 | No. 1 | 0.8 | 12500 | 1.95 | 90.8 |
| Ex. 1 | A 1.4<br>B 2.6 | No. 2 | 0.7 | 12500 | 1.96 | 90.9 |
| | A 1.7<br>B 3.5 | No. 3 | 0.9 | 12500 | 1.97 | 91.0 |
| Comp. Ex. 1 | A 1.6<br>B 3.5 | No. 4 | 0.8 | 12900 | 1.99 | 88.9 |
| | A 1.3<br>B 2.5 | No. 5 | 0.8 | 12100 | 1.93 | 90.9 |
| Ref. Ex. 2 | A 1.5<br>B 3.0 | No. 1 | 1.4 | 12000 | 1.93 | 91.2 |
| Ex. 2 | A 1.6<br>B 3.5 | No. 4 | 1.7 | 12000 | 1.94 | 91.2 |
| | A 1.3<br>B 2.5 | No. 5 | 1.2 | 12000 | 1.93 | 91.3 |
| Comp. Ex. 2 | A 1.4<br>B 2.6 | No. 2 | 1.4 | 11800 | 1.90 | 91.4 |
| | A 1.7<br>B 3.5 | No. 3 | 1.4 | 12200 | 1.95 | 90.8 |

*Estimated from the Mg content in each powder.

Physical properties of sheet

TABLE-continued

| | MI after granu- lation | Ethylene content | Flexural stiffness (Kg/cm$^2$) | Du Pont impact strength (Kg·cm/cm) 20° C. | Du Pont impact strength (Kg·cm/cm) −10° C. | Izod impact strength (Kg·cm/cm) 20° C. | Izod impact strength (Kg·cm/cm) −10° C. |
|---|---|---|---|---|---|---|---|
| Ref. Ex. 1 | 8.9 | 9.3 | 12000 | 68 | 38 | 8.0 | 3.8 |
| Ex. 1 | 8.6 | 9.3 | 12000 | 67 | 39 | 8.0 | 3.9 |
| | 8.5 | 9.4 | 12000 | 68 | 37 | 8.0 | 3.9 |
| Comp. Ex. 1 | 8.2 | 10.5 | 10500 | 78 | 45 | 8.5 | 4.3 |
| | 9.0 | 9.0 | 12500 | 55 | 30 | 7.8 | 3.2 |
| Ref. Ex. 2 | 9.0 | 9.0 | 12500 | 68 | 38 | 7.9 | 3.6 |
| Ex. 2 | 9.1 | 9.2 | 12500 | 67 | 39 | 7.9 | 3.7 |
| | 9.0 | 9.1 | 12500 | 68 | 38 | 7.9 | 3.7 |
| Comp. Ex. 2 | 8.9 | 9.0 | 13000 | 65 | 35 | 7.6 | 3.3 |
| | 8.5 | 9.8 | 11600 | 71 | 41 | 8.2 | 4.0 |

We claim:

1. In a process for the production of a block copolymer of propylene by conducting continuous polymerization of substantially propylene alone at first in a continuous polymerization system to the extent that the amount of propylene polymerized in this continuous step ranges from 50 to 95 wt.% of the entire monomer polymerized in the process, receiving for a predetermined period of time a first polymer slurry, which has been discharged continuously from the polymerization system, in either one of two or more batchwise polymerization tanks provided in parallel to each other and upon a lapse of the predetermined period of time, changing the delivery of the first polymer slurry to the other batchwise polymerization tank or either one of the remaining batchwise polymerization tanks, feeding at least ethylene to each of the batchwise polymerization tanks after completion of the reception of the first polymer slurry therein so as to conduct batchwise polymerization of ethylene and propylene successively in the polymerization tanks such that the ratio of ethylene to propylene ranges from 20/80 to 95/5 on a weight basis, and then discharging a second polymer slurry to a deactivation tank from each of the batchwise polymerization tanks upon completion of the batchwise polymerization therein while allowing a predetermined amount of unreacted ethylene to remain in the batchwise polymerization tanks, the improvement wherein the supply of fresh ethylene is halted to each of the batchwise polymerization tanks until completion of reception of the first polymer slurry from the continuous polymerization system, and a deactivator is charged into each of the batchwise polymerization tanks at the same time as the reception of the first polymer slurry therein while controlling the charging rate of the deactivator in such a way that the partial pressure of ethylene in the vapor phase of each of the batchwise polymerization tanks reaches a predetermined value at the same time as the completion of reception of the first polymer slurry therein, wherein the charging rate of the deactivator is not constant.

2. The process of claim 1, wherein the temperature of each of the batchwise polymerization tanks is controlled so that the internal temperature of each batchwise polymerization tank reaches a predetermined temperature upon completion of the reception of the first polymer slurry therein.

3. The process of claim 1, wherein a desired amount of a catalytic activity improver is charged into each of the batchwise polymerization tanks at a desired point of time in the course of the batchwise polymerization therein.

4. The process of claim 2, wherein a desired amount of a catalytic activity improver is charged into each of the batchwise polymerization tanks at a desired point of time during the course of polymerization therein.

5. The process of claim 1, wherein the continuous polymerization of substantially propylene based monomer occurs at a temperature ranging from 50–90° C.

6. The process of claim 1, wherein the ethylenepropylene copolymer of the block polymer is present in an amount ranging from 5–50 wt.% of the block polymer product.

7. The process of claim 1, wherein the batch polymerization of ethylene and propylene is conducted at a temperature ranging from room temperature to 70° C.

* * * * *